United States Patent
Song et al.

(10) Patent No.: US 7,340,171 B2
(45) Date of Patent: Mar. 4, 2008

(54) FTTH SYSTEM FOR BROADCAST/COMMUNICATION CONVERGENCE USING IEEE 1394

(75) Inventors: Kwan-Woong Song, Seongnam-si (KR); Jeong-Rok Park, Suwon-si (KR); Jae-Hun Cho, Suwon-si (KR); Jun-Ho Koh, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 554 days.

(21) Appl. No.: 10/937,626

(22) Filed: Sep. 9, 2004

(65) Prior Publication Data

US 2005/0169632 A1    Aug. 4, 2005

(30) Foreign Application Priority Data

Feb. 3, 2004    (KR) ...................... 10-2004-0007046

(51) Int. Cl.
*H04J 14/00*    (2006.01)

(52) U.S. Cl. .............................. 398/72; 398/66; 398/67; 398/68; 398/69; 398/70; 398/71; 398/79; 398/59; 398/100; 398/135; 398/163; 398/164; 370/352; 370/353; 370/390; 370/392; 370/480; 370/463; 725/109; 725/110; 725/111; 725/121; 725/127; 725/129; 710/105; 710/106; 710/107

(58) Field of Classification Search .................. 398/70, 398/71, 72, 90, 100, 59, 66, 67, 68, 79, 135, 398/163, 164, 69; 710/105, 106, 107; 370/352, 370/480, 463, 390, 392, 353; 725/110, 111, 725/109, 121, 127, 129
See application file for complete search history.

(56) References Cited

U.S. PATENT DOCUMENTS 6,510,152 B1 * 1/2003 Gerszberg et al. .......... 370/352

7,079,717 B2 * 7/2006 Liu et al. ...................... 385/14

FOREIGN PATENT DOCUMENTS

JP    2000-013786    1/2000

* cited by examiner

*Primary Examiner*—Hanh Phan
(74) *Attorney, Agent, or Firm*—Cha & Reiter, LLC

(57) ABSTRACT

A broadcast/communication convergence system, and an FTTH (Fiber To The Home) system that can accommodate broadcast signals of various channels and variable band signals by converging broadcast and communication signals and transmitting the converged broadcast and communication signals using an IEEE 1394 transmission method serving as a standard interface in the FTTH system for broadcast/communication convergence. An OLT (Optical Line Terminal) transfers a plurality of broadcast signals and a communication signal received from external broadcast and communication providers through a single optical signal (A). An ONU (Optical Network Unit) receives the optical signal (A) from the OLT, separates the received optical signal into the plurality of broadcast signals and the communication signal, opto-electrically converts the plurality of broadcast signals and the communication signal, switches the converted broadcast signals subscriber by subscriber, combines the converted communication signal with the switched converted broadcast signals. The result is transferred to a corresponding subscriber through a single optical signal (B). A gateway at each subscriber is implemented by IEEE 1394 protocol to receive the optical signal (B) from the ONU, separate the received optical signal into the broadcast signals and the communication signal, and transfer the broadcast signals and the communication signal to a corresponding subscriber device.

15 Claims, 4 Drawing Sheets

FTTH SYSTEM FOR BROADCAST/COMMUNICATION CONVERGENCE USING IEEE 1394

CLAIM OF PRIORITY

This application claims priority to an application entitled "FTTH SYSTEM FOR BROADCAST/COMMUNICATION CONVERGENCE USING IEEE 1394", filed in the Korean Intellectual Property Office on Feb. 3, 2004 and assigned Serial No. 2004-7046, the contents of which are hereby incorporated by reference.

BACKGROUND OF THE INVENTION

1. Field of the Invention

The present invention relates to a broadcast/communication convergence system. More particularly, the present invention relates to broadcasting in an FTTH (Fiber To The Home) system.

2. Description of the Related Art

Current communication/broadcast subscribers have the choice of employing a data service chosen from a plurality of data services, such as a very high-speed Internet service, etc. via an ADSL (Asymmetric Digital Subscriber Line), VDSL (Very High Bit-Rate Digital Subscriber Line), Ethernet LAN (Local Area Network), cable modem, etc., and may also employ broadcast services from at least one of cable and satellite broadcasting based on an HFC (Hybrid Fiber Coaxial) system. In other words, the subscribers have the option to employ different mediums to receive the communication and broadcast services. In cases where there are a combination of protocols, a communication service rate is only several Mbps.

In order that high-speed, large-capacity communication/broadcast services can be provided to the subscribers to overcome limitations of older protocols, an FTTH (Fiber To The Home) system for coupling an optical fiber to the subscriber's premises or home is considered to be the best solution. FTTH systems that provide high-speed, large-capacity communication/broadcast services can be classified into one of a PON (Passive Optical Network) and an AON (Active Optical Network).

In order for broadcast/communication convergence to be performed using the FTTH system, there has been proposed an FTTH system for broadcast/communication convergence as shown in FIG. 1. The FTTH system for broadcast/communication convergence shown in FIG. 1 comprises an OLT (Optical Line Terminal) 300, an ONU (Optical Network Unit) 400 and a gateway 500. The components for broadcast/communication convergence perform the following operations.

First, the OLT 300 receives digital broadcast information 100 and external data communication (VOD (Video On Demand), Internet or etc.) information 200 via an external broadcasting network, electro-optically converges received signals into an optical signal, and transmits the optical signal using optical WDM (Wavelength Division Multiplexing) via a WDM 106.

Moreover, the ONU 400 demultiplexes the WDM optical signal received from the OLT 300 into broadcast and communication signals via WDM 107, opto-electrically converts the broadcast and communication signals, processes upstream information received from a subscriber, and carries out a TDM (Time Division Multiplexing) operation for the broadcast and communication signals selected user by user, and transmits a TDM signal.

The gateway 500 carries out a TDDM (Time Division Demultiplexing) operation for the TDM signal received from the ONU 400 and distributes a result of the TDDM operation service by service. The gateway 500 optically transmits the upstream information from the subscriber to the ONU 400.

Now, the components will be described in detail. The OLT 300 shown in FIG. 1 includes: a broadcast MUX (Multiplexer) 101 for receiving digital broadcast signals and multiplexing the received digital broadcast signals; an optical transmitter 102 for converting the multiplexed broadcast signals into an optical signal; a communication switch 103 for receiving the Internet/VOD information 200 to carry out a downstream switching operation for the received Internet/VOD information 200 and receiving an upstream communication signal from each subscriber to carry out an upstream switching operation for the received upstream communication signal to a network for the Internet/VOD information 200; an optical transmitter (Tx) 104 for converting a downstream communication signal into an optical signal; an optical receiver (Rx) 105 for receiving an upstream optical signal and converting the received upstream optical signal into an electrical signal; and a wavelength division multiplexer 106 for carrying out a WDM (Wavelength Division Multiplexing) operation and transmitting a result of the WDM operation.

Moreover, the ONU 400 shown in FIG. 1 includes: a wavelength division demultiplexer 107 for separating an optical signal received from the OLT 300 into broadcast and communication signals; a broadcast DEMUX (Demultiplexer) 108 for separating the broadcast signals received from the wavelength division demultiplexer 107 on a broadcast channel-by-channel basis; a broadcast switch 109 for switching the broadcast signals separated channel by channel according to the subscriber's selection operation; a communication switch 112 for switching a downstream communication signal separated from the wavelength division demultiplexer 107 subscriber by subscriber and switching an upstream communication signal received from the subscriber to the OLT 300; time division multiplexers 110-1 to 110-n for carrying out a TDM operation for the broadcast and communication signals subscriber by subscriber; and optical transceiver (Tx/Rx) 111-1 to 111-n for transmitting the broadcast and communication signals multiplexed by the time division multiplexers 110-1 to 110-n to respective subscribers (or gateways) and transmitting upstream signals from the subscribers to the communication switch 112 via the time division multiplexers 110-1 to 110-n.

Moreover, each gateway 500, as shown in the exploded view in FIG. 1, includes: a transceiver (Tx/Rx) 113 for receiving a downstream signal from the ONU 400 and transmitting an upstream signal to the ONU 400; a time division demultiplexer 114 for separating the broadcast and communication signals multiplexed by the TDM operation; and a communication switch 115 for receiving the communication signal from the time division demultiplexer 114 to transmit the received communication signal to a communication unit such as an Internet/PC (Personal Computer) 118 of the subscriber, etc., and receiving an upstream signal from the communication unit (such as the Internet/PC 118, etc.) to transmit the received upstream signal to the ONU 400.

After receiving the broadcast signals transferred from the time division demultiplexer 114, the subscriber decodes the broadcast signals through an STB (Set-Top Box) 116, views the broadcast on a digital TV (Television) 117, and can access the network by transmitting and receiving the communication signals sent through the Internet/PC 118.

The conventional FTTH system for broadcast/communication convergence carries out a TDM operation for the broadcast and communication signals to transmit a result of the TDM operation according to a connection between the ONU 400 and the gateway 500, and subsequently carries out a TDDM operation. However, the conventional FTTH system has problems when accommodating items such as a multi-channel broadcast signal or a broadband communication signal.

The reason that the conventional FTTH system for broadcast/communication convergence has problems accommodating multi-channel broadcast signals or broadband communication signals is that the FTTH system employs a TDM operation for multiplexing a communication signal (e.g., Ethernet data) between the ONU 400 and the gateway 500 at a subscriber side and broadcast signals selected by the subscriber into one time frame, followed by transmitting a result of the multiplexing. Here, the time frame is generated through an FPGA (Field Programmable Gate Array). In this case, the FPGA can accommodate only a 100-Mbps Ethernet signal and a maximum of two HD (High Definition) channels because of the limitations of its processing rate. In particular, the FPGA is designed so that it can accommodate only fixed-length broadcast signals. For this reason, the conventional FTTH system for broadcast/communication convergence is not capable of accommodating broadcast signals based on various standards (e.g., broadcast signals of various wavelengths), and cannot accommodate three-channel broadcast signals.

SUMMARY OF THE INVENTION

The present invention provides an FTTH (Fiber To The Home) system for broadcast/communication convergence using IEEE (Institute of Electrical and Electronics Engineers) 1394 that can accommodate broadcast signals of various channels and variable band signals by converging broadcast and communication signals and transmitting the converged broadcast and communication signals using an IEEE 1394 transmission method serving as a standard interface in the FTTH system for broadcast/communication convergence.

BRIEF DESCRIPTION OF THE DRAWINGS

The above features and other advantages of the present invention will be more clearly understood from the following detailed description taken in conjunction with the accompanying drawings, in which.

DETAILED DESCRIPTION

Figure 1:
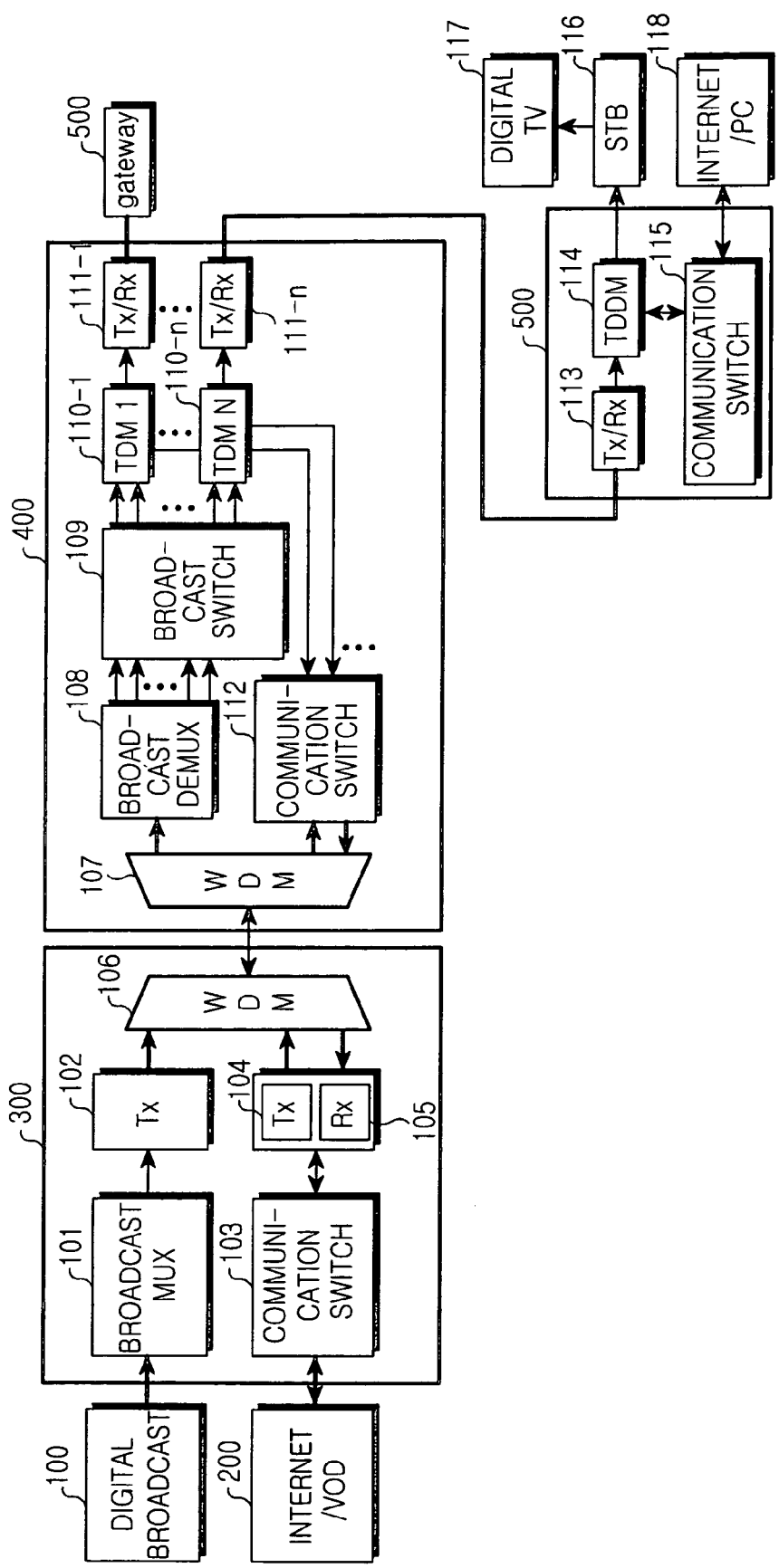
FIG. 1 is a block diagram illustrating an FTTH (Fiber To The Home) system for broadcast/communication convergence as has been previously proposed.

Now, several aspects of the present invention will be described in detail with reference to the annexed drawings. In the drawings, the same or similar elements are denoted by the same reference numerals even though they are depicted in different drawings. For the purposes of clarity and simplicity, a detailed description of known functions and configurations incorporated herein will be omitted as it may obscure the subject matter of the present.

Figure 2:
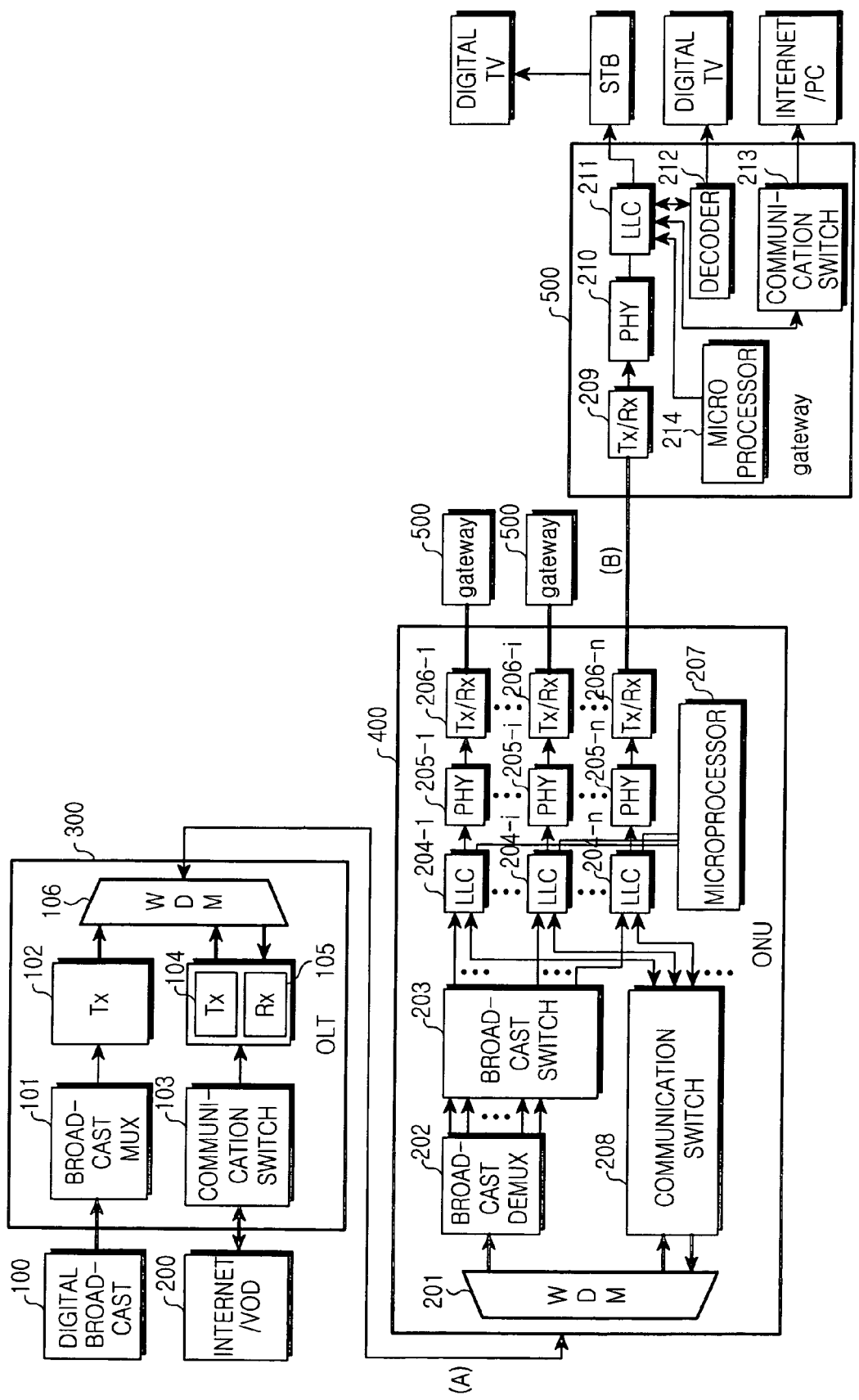
FIG. 2 is a block diagram illustrating an FTTH (Fiber To The Home) system for broadcast/communication convergence using IEEE (Institute of Electrical and Electronics Engineers) 1394 in accordance with an aspect of the present invention.

FIG. 2 is a block diagram illustrating an FTTH (Fiber To The Home) system for broadcast/communication convergence using IEEE (Institute of Electrical and Electronics Engineers) 1394 in accordance with an aspect of the present invention.

As shown in FIG. 2, the FTTH system for broadcast/communication convergence using IEEE 1394 in accordance with the present invention includes the components of the OLT 300 and the connection between the OLT 300 and the ONU 400 as in the conventional FTTH system for broadcast/communication convergence shown in FIG. 1. Therefore, a description of the identical components and connection structures will be omitted.

Before a detailed description is given of a constitution of the present invention, a description will be given of IEEE 1394.

IEEE 1394 is called "Firewire" as a standard of a serial bus interface jointly created by Apple Computer, Inc. and Texas Instruments, Inc. IEEE 1394 was conceived in 1986 and was standardized on December 1995 by IEEE.

IEEE 1394 serves as a serial bus interface that enables a maximum of 63 nodes to be coupled to each bus. Due to the fact that IEEE 1394 gives a priority to isochronous data in processing isochronous data/AV (Audio Visual) stream data mainly used for transmitting multimedia information, and asynchronous data/control and packet data used for transmitting communication or control information, there is an advantage in that QoS (Quality of Service) for multimedia data can be ensured in a home network. Moreover, IEEE 1394a defines S100, S200 and S400 bit rates, and IEEE 1394b defines optical mediums such as POFs (Plastic Optical Fibers), SMFs (Single Mode Fibers), MMFs (Multi-Mode Fibers), etc., such that a high bit rate of 3.2 Gbps can be ensured and hence it is predicted that an effective solution for the home network and remote data communication will be provided.

The FTTH system in accordance with the aspect of the present invention employs the MMF or SMF as the transfer medium according to the IEEE 1394b standard. The present invention shows an example of the design of a low-priced light source.

Here, the low-priced light source can be selected according to a transmission distance, transmission rate, price, etc. A typical example of the low-priced light source used in the conventional FTTH system is an SFP (Small Form-factor Pluggable). Where the MMF is employed as the transfer medium in the SFP of an output wavelength of 850 nm, an optical signal can be transmitted up to a maximum of 3 Km at 1.25 Gbps. Accordingly, the FTTH system using IEEE 1394 employs the SFP as the light source, because the ONU 400 and the subscriber (or gateway 500) can be designed within approximately 1~2 Km.

The currently commercialized IEEE 1394b supports a maximum transmission rate of 800 Mbps. The IEEE 1394b standard defines a transmission rate of up to 3.2 Gbps. For this reason, transmission capacity of the FTTH system will be able to be improved using IEEE 1394 in the future as taught by the present invention.

Figure 4:
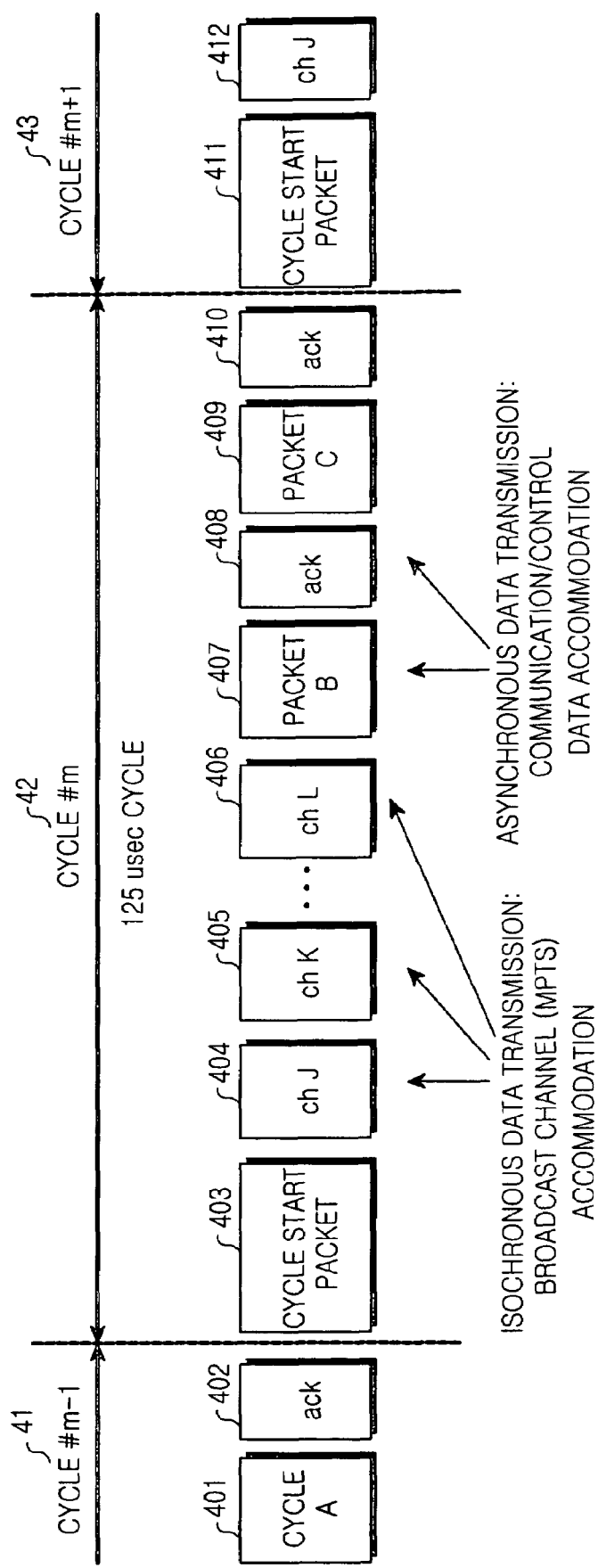
FIG. 4 shows an example of a data transmission cycle used in the present invention.

FIG. 4 shows an example of a data transmission cycle used in the present invention.

IEEE 1394 basically defines 125 us as one cycle 41, 42 or 43, and defines a transfer layer with a data rate of S100, S200, S400, S800, S1600 or S3200. According to IEEE 1394, isochronous data units 404, 405, 406 and 412 can occupy a maximum of 80% of one cycle, while asynchronous data units 401, 402, 407, 408, 409 and 410 can occupy a total of 20% of one cycle. In the beginning of each cycle 41, 42 or 43, a cycle start packet 403 or 411 is used to indicate that a new cycle starts.

Because a transmission timing of the isochronous data is first taken into account and the isochronous data is transmitted in a transmission form appropriate for transmitting multimedia data, the isochronous data is transmitted prior to the asynchronous data. On the other hand, the asynchronous data can employ 20% of one cycle, and is transmitted taking into account its transmission quality.

Therefore, in accordance with the present invention, a broadcast signal is assigned to the isochronous data, while a communication signal (e.g., a zapping signal or a signal from an NMS/EMS (Network Management System/Element Management System) or etc. is assigned to the asynchronous data. Accordingly, the present invention can perform a transmission operation based on broadcast/communication convergence as in TDM (Time Division Multiplexing) of the conventional FTTH system.

Moreover, a plurality of isochronous channels 404, 405 and 406 can be accommodated within a transmission cycle of 125 us in IEEE 1394. Where the maximum transmission capacity is designed at 400 Mbps, the isochronous channels can consist of channels of various lengths at a maximum of 300 Mbps if asynchronous data transmission at 100 Mbps is assigned for use in the Ethernet.

For example, a maximum of 6 fixed-length broadcast channels at 50 Mbps can be supported. In case of 27-Mbps broadcast channels, 11 channels can be transmitted to a single subscriber. Moreover, as the length of each isochronous packet varies, data can be transmitted according to various broadcast formats. Theoretically, a maximum of 64 isochronous channels can be supported.

Thus, the FTTH system according to the present invention provides a transmission technology or operation between the ONU 400 and the gateway 500 that is implemented using the IEEE 1394 transmission method in the inventive FTTH system, rather than an implementation TDM through the FPGA as known heretofore.

As shown in FIG. 2, the ONU 400 includes: a wavelength division demultiplexer 201 for separating an optical signal received from the OLT 300 into broadcast and communication signals; a broadcast DEMUX (Demultiplexer) 202 for separating the broadcast signals received from the wavelength division demultiplexer 201 on a broadcast channel-by-channel basis; a broadcast switch 203 for switching the broadcast signals separated channel by channel according to a subscriber's selection operation; a communication switch 208 for switching a downstream communication signal separated from the wavelength division demultiplexer 201 subscriber by subscriber, and for transmitting an upstream communication signal received from the subscriber to the OLT 300; LLCs (Link Layer Controllers) 204-1 to 204-n for converting the broadcast and communication signals switched subscriber by subscriber into IEEE 1394 data; IEEE 1394 PHYs (PHYsical layer controllers) 205-1 to 205-n responsible for IEEE 1394 interfacing; low-priced optical transceiver (Tx/Rx) 206-1 to 206-n for transmitting the IEEE 1394 data to the gateway 500; and a microprocessor 207 coupled to the LLCs 204-1 to 204-n for controlling flow of the broadcast signals to provide a path for the communication signal and processing of a control signal (e.g., channel zapping).

Moreover, each gateway 500 comprises: an optical transceiver (Tx/Rx) 209 for optically transmitting and receiving light based on IEEE 1394; a PHY (PHYsical layer controller) 210 for receiving IEEE 1394 data transferred through the low-priced optical transceiver 209; an LLC (Link Layer Controller) 211 for converting the IEEE 1394 data into the broadcast and communication signals; a decoder 212 for receiving and decoding the broadcast signals from the LLC 211 and providing the decoded broadcast signals to a digital TV (Television); a communication switch 213 for receiving the communication signal from the LLC 211 to transfer the received communication signal to the subscriber and receiving an upstream communication signal from the subscriber to transfer the received upstream communication signal to the LLC 211; and a microprocessor 214 coupled to the LLC 211 for controlling flow of the broadcast signals, providing a path for the communication signal, and for processing a control signal (e.g., channel zapping).

Moreover, each subscriber is directly coupled to the LLC 211 using the STB supporting the IEEE 1394 standard to use the digital TV. Where IEEE 1394 is not supported, the digital TV is used through the decoder 212. Data service is received through the communication switch 213 using the Internet/PC (Personal Computer).

Figure 3:
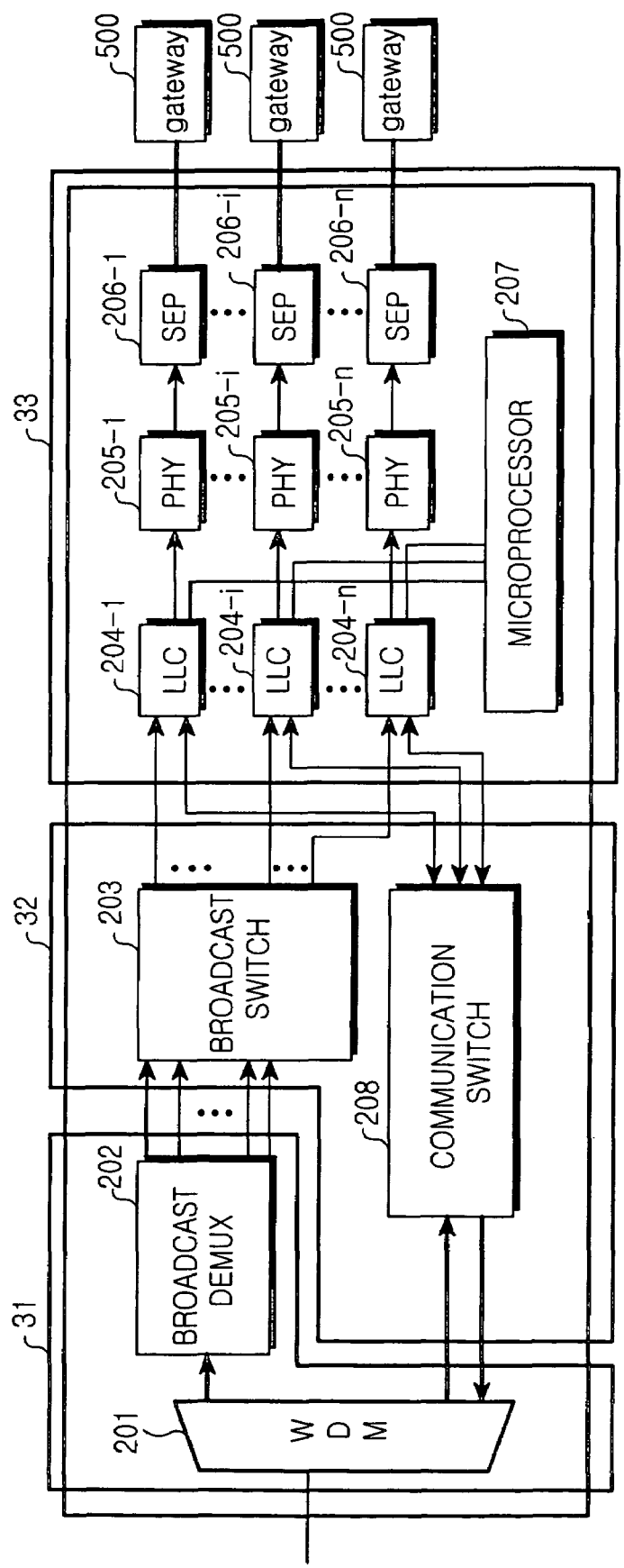
FIG. 3 is a block diagram illustrating an ONU (Optical Network Unit) included in the FTTH system for broadcast/communication convergence using IEEE 1394 in accordance with an aspect of the present invention.

FIG. 3 is a block diagram illustrating the ONU 400 included in the FTTH system for broadcast/communication convergence using IEEE 1394 in accordance with another aspect of the present invention.

As shown in FIG. 3, the ONU 400 in accordance with the present invention comprises: a receiving/demultiplexing unit 31 for receiving a signal from the OLT; a broadcast/communication data switching unit 32 for switching the broadcast and communication signals; and an IEEE 1394 data controlling and transmitting/receiving unit 33 for transmitting and receiving IEEE 1394 data. It should be noted that units 31 and 32 could be arranged somewhat differently than as shown in FIG. 3, as the illustration is provided for explanatory purposes, and is not intended to limit the invention to the arrangement shown.

According to this aspect of the present invention, the IEEE 1394 data controlling and transmitting/receiving unit 33 converts data output from the broadcast switch 203 into an IEEE 1394 transmission frame and transmits the IEEE 1394 transmission frame to the gateway 500 subscriber by subscriber. In order to perform such functions, the ONU according to the present invention includes the IEEE 1394 data controlling and transmitting/receiving unit 33 having IEEE 1394 LLCs 204-1 to 204-n, IEEE 1394 PHYs 205-1 to 205-n, SFPs 206-1 to 206-n, and a microprocessor 207.

Here, the LLCs 204-1 to 204-n include a predetermined number of buffers adapted for being controlled and having a predetermined number of data interfaces. Since each of the buffers included in the LLCs 204-1 to 204-n is assigned to a single broadcast channel (or MPTS (Multi-Program Transport Stream)), the number of buffers corresponds to the number of acceptable broadcast channels (or MPTSs).

Moreover, the microprocessor 207 coupled to the LLCs 204-1 to 204-n controls a flow of the broadcast signals, provides a path of the communication signal and processes a control signal (e.g., channel-zapping, etc.). The operation of the microprocessor 207 typically conforms to a specification of the IEEE 1394 standard.

The PHYs 205-1 to 205-n enabling a beta output based on the IEEE 1394a standard can directly drive light sources for various subscribers such as a UTP (Unshielded Twisted Pair), a POF (Plastic Optical Fiber), an SFP (Small Form-factor Pluggable), etc. Preferably, the SFPs 206-1 to 206-n are used to ensure a transmission distance between the ONU and the subscriber within 2 Km and a transmission bandwidth of a 400-Mbps class. The system can be configured using various light sources such as an SFF (Small Form Factor), a bidirectional transceiver, multiple sources, etc. The optical transceiver (Tx/Rx) 206-1 to 206-n shown in FIG. 2 use the SFPs 206-1 to 206-n shown in FIG. 3.

The subscriber gateway 500 employs an IEEE 1394 transmitting/receiving unit (e.g., the above-described low-priced light source, etc.) as in the configuration of the ONU 400. The gateway 500 is symmetric to the IEEE 1394 controlling and transmitting/receiving unit of the ONU 400. This has been described with reference to FIG. 2. Transceivers for IEEE 1394 data are independently implemented subscriber by subscriber. In other words, when an IEEE 1394 device is attached or removed where a network for multiple channels using IEEE 1394 is implemented, an operation for resetting a system is independently carried out in each subscriber, such that no interference occurs. According to the implementation of an independent IEEE 1394 transmission network, the IEEE 1394 transmission network can provide a sufficient communication bandwidth and a plurality of high-quality broadcast channels.

As apparent from the above description, the present invention can accommodate broadcast signals of various channels by converging broadcast and communication signals and transmitting the converged broadcast and communication signals using an IEEE (Institute of Electrical and Electronics Engineers) 1394 transmission method serving as a standard interface in an FTTH (Fiber To The Home) system for broadcast/communication convergence.

Moreover, the present invention can accommodate variable band signals by transmitting data through IEEE 1394.

Although the preferred aspects of the present invention have been disclosed for illustrative purposes, those skilled in the art will appreciate that various modifications, additions and substitutions are possible, without departing from the spirit of the invention or the scope of the appended claims.

What is claimed is:

1. An FTTH (Fiber To The Home) system for broadcast/communication convergence, comprising:
   an OLT (Optical Line Terminal) for transferring a plurality of broadcast signals and a communication signal received from external broadcast and communication providers through a single optical signal (A);
   an ONU (Optical Network Unit) for receiving the optical signal (A) from the OLT, separating the received optical signal into the plurality of broadcast signals and the communication signal, opto-electrically converting the plurality of broadcast signals and the communication signal, switching the converted broadcast signals subscriber by subscriber, combining the converted communication signal with the switched converted broadcast signals, and transferring a resulting combined converted communication signal and switched converted broadcast signals to a corresponding subscriber through a single optical signal (B), said ONU comprising:
   a receiving/demultiplexing unit for receiving the optical signal (A) from the OLT, separating the received optical signal into the plurality of broadcast signals and the communication signal, and demultiplexing the plurality of broadcast signals channel by channel;
   a broadcast/communication data switching unit for switching the broadcast signals demultiplexed by the receiving/demultiplexing unit subscriber by subscriber, and switching a downstream communication signal received from the receiving/demultiplexing unit and an upstream communication signal received from the gateway; and
   a first IEEE 1394 data controlling and transmitting/receiving unit for converting the switched broadcast signals and the downstream communication signal into IEEE 1394 data to transmit the IEEE 1394 data, and receiving IEEE 1394 data from the gateway; and
   a gateway at each subscriber for receiving the optical signal (B) from the ONU, separating the received optical signal into the broadcast signals and the communication signal, and transferring the broadcast signals and the communication signal to a corresponding subscriber device,
   wherein a connection between the ONU and the gateway at each subscriber is implemented by IEEE (Institute of Electrical and Electronics Engineers) 1394 protocol.

2. The FTTH system according to claim 1, wherein the first IEEE 1394 data controlling and transmitting/receiving unit comprises:
   an LLC (Link Layer Controller) coupled to each subscriber for converting the switched broadcast signals and the downstream communication signal into IEEE 1394 data;
   a PHY (PHYsical layer controller) coupled to the LLC coupled to each subscriber for carrying out IEEE 1394 interfacing;
   an optical transceiver coupled to the PHY coupled to each subscriber for transmitting the IEEE 1394 data to the gateway; and
   a microprocessor coupled to the LLC coupled to each subscriber for controlling flow of the broadcast signals, providing a path of the communication signal and processing a control signal.

3. The FTTH system according to claim 2, wherein the optical transceiver coupled to each subscriber is an SFP (Small Form-factor Pluggable).

4. The FTTH system according to claim 3, wherein the LLC coupled to each subscriber includes the switched broadcast signals in isochronous data of the IEEE 1394 data, and includes the downstream communication signal in asynchronous data.

5. The FTTH system according to claim 3, wherein the LLC coupled to each subscriber comprises:
   at least one buffer capable of being controlled for buffering a broadcast signal of one channel among the switched broadcast signals.

6. The FTTH system according to claim 2, wherein the LLC coupled to each subscriber includes the switched broadcast signals in isochronous data of the IEEE 1394 data, and includes the downstream communication signal in asynchronous data.

7. The FTTH system according to claim 2, wherein the LLC coupled to each subscriber includes the switched broadcast signals in isochronous data of the IEEE 1394 data, and includes the downstream communication signal in asynchronous data.

8. The FTTH system according to claim 2, wherein the LLC coupled to each subscriber comprises:
   at least one buffer capable of being controlled for buffering a broadcast signal of one channel among the switched broadcast signals.

9. The FTTH system according to claim 2, wherein the LLC coupled to each subscriber comprises:
   at least one buffer capable of being controlled for buffering a broadcast signal of one channel among the switched broadcast signals.

10. The FTTH system according to claim 1, wherein the gateway at each subscriber comprises:

a second IEEE 1394 data controlling and transmitting/receiving unit for receiving the optical signal (B) received from the ONU through IEEE 1394, and separating the received optical signal into the switched broadcast signals and the communication signal; and a broadcast/communication switch for switching the broadcast signals and the communication signal received from the second IEEE 1394 data controlling and transmitting/receiving unit to a corresponding subscriber device.

11. A method for providing broadcast/communication convergence in a FTTH (Fiber To The Home) system, comprising the steps of:

(a) transferring a plurality of broadcast signals and a communication signal received from external broadcast and communication providers through a single optical signal (A) by an OLT (Optical Line Terminal);

(b) receiving the optical signal (A) from the OLT, separating the received optical signal into the plurality of broadcast signals and the communication signal, optoelectrically converting the plurality of broadcast signals and the communication signal, switching the convened broadcast signals subscriber by subscriber, combining the converted communication signal with the switched converted broadcast signals, and transferring a resulting combined converted communication signal and switched converted broadcast signals to a corresponding subscriber through a single optical signal (B) by an ONU (Optical Network Unit), wherein said ONU comprises:

a receiving/demultiplexing unit;

a broadcast/communication data switching unit; and a first IEEE 1394 data controlling and transmitting/receiving unit;

(c) receiving the optical signal (B) from the ONU, separating the received optical signal into the broadcast signals and the communication signal, and transferring the broadcast signals and the communication signal to a corresponding subscriber device at a gateway at each subscriber, wherein a connection between the ONU and the gateway at each subscriber is implemented by IEEE (Institute of Electrical and Electronics Engineers) 1394 protocol.

12. The method according to claim 11, wherein the first IEEE 1394 data controlling and transmitting/receiving unit comprises:

an LLC (Link Layer Controller) coupled to each subscriber for converting the switched broadcast signals and the downstream communication signal into IEEE 1394 data;

a PHY (PHYsical layer controller) coupled to the LLC coupled to each subscriber for carrying out IEEE 1394 interfacing;

an optical transceiver coupled to the PHY coupled to each subscriber for transmitting the IEEE 1394 data to the gateway; and a microprocessor coupled to the LLC coupled to each respective subscriber for controlling flow of the broadcast signals and for providing a path for the communication signal, and for processing a control signal.

13. The method according to claim 12, wherein the optical transceiver coupled to each subscriber comprises an SFP (Small Form-factor Pluggable).

14. The method according to claim 12, wherein the LLC coupled to each subscriber includes the switched broadcast signals in isochronous data of the IEEE 1394 data, and includes the downstream communication signal in asynchronous data.

15. The method according to claim 12, wherein the LLC coupled to each subscriber includes the switched broadcast signals in isochronous data of the IEEE 1394 data, and includes the downstream communication signal in asynchronous data.

* * * * *